United States Patent
Dementiev et al.

(10) Patent No.: US 7,612,985 B2
(45) Date of Patent: Nov. 3, 2009

(54) ELECTROCHEMICAL DOUBLE-LAYER CAPACITOR USING ORGANOSILICON ELECTROLYTES

(75) Inventors: Viacheslav V. Dementiev, Madison, WI (US); Robert C. West, Madison, WI (US); Robert J. Hamers, Madison, WI (US); Kiu-Yuen Tse, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 12/168,405

(22) Filed: Jul. 7, 2008

(65) Prior Publication Data

US 2008/0273290 A1 Nov. 6, 2008

Related U.S. Application Data

(62) Division of application No. 11/240,132, filed on Sep. 30, 2005, now Pat. No. 7,466,539.

(51) Int. Cl.
*H01G 9/00* (2006.01)

(52) U.S. Cl. .................. 361/502; 361/503; 361/504; 361/508; 361/510; 361/512

(58) Field of Classification Search .......... 361/502, 361/503–504, 508–512, 516–519, 523–528
See application file for complete search history.

(56) References Cited

U.S. PATENT DOCUMENTS

| | | | |
|---|---|---|---|
| 3,555,369 A | 1/1971 | Yoshino | |
| 4,713,731 A * | 12/1987 | Boos et al. | 361/502 |
| 5,194,341 A | 3/1993 | Bagley et al. | |
| 5,362,493 A * | 11/1994 | Skotheim et al. | 429/313 |
| 5,751,541 A | 5/1998 | Li et al. | |
| 5,963,417 A | 10/1999 | Anderson et al. | |
| 6,337,383 B1 | 1/2002 | West et al. | |
| 6,721,168 B2 | 4/2004 | Takeuchi et al. | |
| 6,887,619 B2 | 5/2005 | West et al. | |
| 6,888,217 B2 | 5/2005 | Gilgen et al. | |
| 6,894,890 B2 | 5/2005 | Takatani et al. | |
| 6,989,982 B2 | 1/2006 | Kobayashi et al. | |
| 6,992,880 B2 | 1/2006 | Tadanobu et al. | |
| 7,057,881 B2 | 6/2006 | Chow et al. | |
| 2003/0030963 A1 | 2/2003 | Tennent et al. | |
| 2003/0143453 A1 | 7/2003 | Ren et al. | |
| 2003/0180625 A1 | 9/2003 | Oh et al. | |
| 2003/0198869 A1 | 10/2003 | West et al. | |
| 2004/0197665 A1 | 10/2004 | Amine et al. | |
| 2004/0214090 A1 | 10/2004 | West et al. | |
| 2004/0248014 A1 | 12/2004 | West et al. | |
| 2005/0170254 A1 | 8/2005 | West et al. | |

FOREIGN PATENT DOCUMENTS

JP  2002/289476  10/2002

OTHER PUBLICATIONS

E. Frackowiak et al., Carbon materials for the electrochemical storage of energy in capacitors 39 Carbon 937-950 (2001).

(Continued)

*Primary Examiner*—Nguyen T Ha
(74) *Attorney, Agent, or Firm*—Quarles & Brady LLP

(57) ABSTRACT

Disclosed are supercapacitors having organosilicon electrolytes, high surface area/porous electrodes, and optionally organosilicon separators. Electrodes are formed from high surface area material (such as porous carbon nanotubes or carbon nanofibers), which has been impregnated with the electrolyte. These type devices appear particularly suitable for use in electric and hybrid electric vehicles.

5 Claims, 4 Drawing Sheets

OTHER PUBLICATIONS

G. Gryglewicz et al., Effect of pore size distribution of coal-based activated carbons on double layer capacitance, 50 Electrochimica Acta 1197-1206 (2005).

Y. Lee et al., Carbon Nanotube-Based Supercapacitors, 1 Encyclopedia Of Nanoscience And Nanotechnology 625-634, American Scientific Publishers (2004).

M. Hughes, Carbon Nanotube-Conducting Polymer Composites In Supercapacitors, 1 Encyclopedia Of Nanoscience And Nanotechnology 447-459, American Scientific Publishers (2004).

E. Frackowiak, Carbon Nanotubes For Storage Of Energy: Supercapacitors, Encyclopedia of Nanoscience and Nanotechnology, Marcel Dekker, New York (2004).

S. Tsang et al., A simple chemical method of opening and filling carbon nanotubes, 372 Nature 159-162 (1994).

Z. Jia et al., Production of short multi-walled carbon nanotubes, 37 Carbon 903-906 (1999).

C. Du et al., High power density supercapacitors using locally aligned carbon nanotube electrodes, 16 Nanotechnology 350-353 (2005).

C. Du et al., Carbon nanotube thin films with ordered structures, 15 J. Mat. Chem. 548-550 (2005).

Z. F. Ren et al., Synthesis of Large Arrays of Well-Aligned Carbon Nanotubes on Glass, 282 Science 1105-1107 (1998).

J. Li et al., Nanoelectronics: Growing Y-junction carbon nanotubes, 402 Nature, 253-254 (2000).

H. Baughman et al., Carbon Nanotubes—the Route Toward Applications, 297 Science, 787-792 (2002).

S. Baker et al., Covalently Bonded Adducts of Deoxyribonucleic Acid (DNA) Oligonucleotides with Single-Wall Carbon Nanotubes: Synthesis and Hybridization, 2 Nano Letters, 1413-1417 (2002).

C.S. Lee et al., Electrically Addressable Biomolecular Functionalization of Carbon Nanotube and Carbon Nanofiber Electrodes, 4 Nano Letters, 1713-1716(2004).

Q. Chen et al., Fabrication and electrochemical properties of carbon nanotube array electrode for supercapacitors, 49 Electrochimica Acta 4157-4161 (2004).

R. Hooper et al., Highly Conductive Siloxane Polymers, 34 Macromolecules 931-936 (2001).

R. Hooper et al., Novel siloxane polymers as polymer electrolytes for high energy density lithium batteries, 1 Silicon Chemistry 121-128 (2002).

R. Hooper et al., A Highly Conductive Solid-State Polymer Electrolyte Based on a Double-Comb Polysiloxane Polymer with Oligo(ethylene oxide) Side Chains, 18 Organometallics 3249-3251 (1999).

Z. Zhang et al., Ion conductive characteristics of cross-linked network polysiloxane-based solid polymer electrolytes, 170 Solid State Ionics 233-238 (2004).

Z. Zhang et al., Cross-Linked Network Polymer Electrolytes Based on a Polysiloxane Backbone with Oligo(oxyethylene) Side Chains: Synthesis and Conductivity, 36 J. Macromolecules 9176-9180 (2003).

Z. Zhang et al., Network-Type Ionic Conductors Based on Oligoethyleneoxy-Functionalized Pentamethylcyclopentasiloxanes, 38 Macromolecules 5714-5720 (2005).

* cited by examiner

ELECTROCHEMICAL DOUBLE-LAYER CAPACITOR USING ORGANOSILICON ELECTROLYTES

CROSS-REFERENCE TO RELATED APPLICATIONS

This application is a divisional application of U.S. patent application Ser. No. 11/240,132, filed Sep. 30, 2005, now U.S. Pat. No. 7,466,539.

STATEMENT REGARDING FEDERALLY SPONSORED RESEARCH/DEVELOPMENT

The invention was made with United States government support awarded by the following agency: NSF 0210806. The United States government has certain rights in this invention.

BACKGROUND OF THE INVENTION

The present invention relates to electric double-layer capacitors (EDLCs), which are sometimes also referred to in the art as "electrochemical capacitors", "supercapacitors", or "ultracapacitors". More particularly, it relates to the use of organosilicon electrolytes, and in some instances optionally an organosilicon separator and/or binder in such devices.

A schematic example of a known type of EDLC is depicted in FIG. 1. This drawing shows an electrochemical double-layer capacitor 10 having two electrodes 11 which are kept from electrical contact by a separator 12. There are current collectors 13 at opposite ends of the device. The electrode consists of a porous material 14 and an electrolyte 15. Both the separator 12 and the porous material 14 are immersed in the electrolyte 15.

The electrolyte allows ions to move freely through the separator. The separator is designed to prevent electrical contact between the electrodes which otherwise might create a short circuit in the device.

The current collecting plates 13 are in contact with the backs of the electrodes 11. Electrostatic energy is stored in polarized liquid layers, which form when a potential is applied across two of the electrodes. A "double layer" of positive and negative charges is formed at the electrode-electrolyte interface.

Electrochemical double-layer capacitors provide energy storage as well as pulse power delivery. This is useful in many applications, and particularly where high power pulses are desired. In this regard, other energy storage devices such as batteries or fuel cells, which can store large amount of energy, cannot deliver high power pulses. Another advantage of supercapacitors is that they can be charged rapidly.

To be optimally effective such devices must, among other properties, have low internal resistance, store large amounts of charge, be physically strong, be stable at desired voltages, and be otherwise compatible with the usage environment. Therefore, there are many design parameters that must be considered in construction of such devices.

Electrochemical double-layer charge storage is a surface process and the surface characteristics of the electrode material can greatly influence the capacitance of the device. In this regard, the electrodes of a supercapacitor are typically made of very high surface area materials (e.g. porous carbon or carbon aerogels, carbon nanotubes, carbon foams or fibers, porous metal oxides) in order to maximize the surface area of the double-layers. High electrode-electrolyte interfacial surface area and nanometer dimensions of the charge separation layer result in high specific capacitance of electrodes so that high energy densities can be achieved in EDLCs.

It is particularly desirable that electrode materials in EDLCs have large pore diameters and good pore connectivity, so that electrolyte can easily penetrate the pores, facilitating rapid ion motion and high conductivity. Electrons can then easily flow from the electrode to the current collector and vice versa.

Carbon is the most widely used high surface area electrode material for EDLCs. Carbon can form specific textures, providing high surface area. High surface area carbon is particularly desirable because it can form mesopores or graphite crystallites suitable for ions intercalation.

See also U.S. Pat. Nos. 5,963,417 and 6,721,168, as well as U.S. patent application publication 2003/0030963 regarding a variety of other known high surface area materials for electrodes for various applications. The disclosure of these patents and patent application publications, and of all other publications referred to herein, is incorporated by reference as if fully set forth herein.

Aqueous and some organic electrolyte solutions have in the past been used in electrochemical double layer capacitors. Aqueous electrolytes, as compared to earlier organic electrolytes, provide lower equivalent series resistance improving the time constant of a supercapacitor and providing high power densities. However, they were not stable at the operating voltages exceeding the electrolysis voltage of water (1.23 V) and that made organic liquid electrolytes preferable to aqueous electrolyte solutions for many commercial applications.

Organic liquid electrolytes that can be used in supercapacitors should preferably have higher ionic conductivity. As an example, acetonitrile providing high ionic conductivity has been used in such electrolytes. However, acetonitrile is a hazardous flammable and toxic material, which produces highly toxic products (HCN and CO) upon combustion and thermal decomposition.

Other previously used organic liquid electrolytes, like those based on alkyl carbonates (ethylene carbonate, propylene carbonate, and γ-butyro-lactone, or dimethylcarbonate, diethylcarbonate, and ethylmethylcarbonate, for example) are highly flammable. They have lower ionic conductivity as compared to aqueous electrolytes or electrolytes based on acetonitrile, and this causes higher internal losses of stored energy and power density of the supercapacitor.

In unrelated work ion-conducting organosilicon polymer electrolytes have been proposed for lithium-polymer battery applications. See e.g. U.S. Pat. No. 6,337,383 and U.S. patent application publications 2003/0198869, 2004/0197665, 2004/0214090 and 2004/0248014. However, there was no teaching in these references to combine an organosilicon material with a high surface area material to create a supercapacitor electrode, or any suggestion to use ion-conducting organosilicon material as a binder or as a separator layer in supercapacitors.

Hence, there is a continuing need for EDLCs with improved safety and other characteristics, particularly those capable of operating stably at higher voltages.

SUMMARY OF THE INVENTION

In one aspect the invention covered by this divisional application there is provided an electrode for use in an electrochemical capacitor. The electrode has a porous material, and an organosilicon electrolyte. The preferred organosilicon electrolyte is a mixture of oligoethyleneoxide substituted silane or siloxane with a lithium salt, e.g. lithium(bis-oxalato)

borate. For example, the exposed surface may be in the form of a patterned array of spaced carbon nanofibers.

In another aspect of the invention covered by this divisional application there is provided an electrochemical double-layer capacitor comprising a separator disposed between first and second electrodes, wherein the separator comprises an organosilicon material, such as a cross-linked oligoethyleneoxide substituted organosiloxane.

"Porous/" is being used not only in its conventional sense, but also to include fiber arrays, nanostructured materials such as carbon nanofiber arrays, nanostructured graphite, and other materials in which the structure provides spacings creating a high surface area accessible for ions and electrolyte molecules. Thus, a "porous" material will include without limitation, porous carbon, carbon with crystallites suitable for ions intercalation, porous metal oxides, nanostructured metal oxides, etc.

The separator can be made of a solid organosilicon material (e.g. a cross-linked polysiloxane having oxyethylene moieties), and there can be a first current collector adjacent the first electrode and a second current collector adjacent the second electrode, with both collectors preferably made from a highly conductive material, for example metal such as aluminum, nickel, copper, titanium, molybdenum, silver, gold or steel.

In aspects of the invention covered by a parent application there are disclosed electrochemical double-layer capacitors based on organosilicon electrolytes. In one embodiment there is an electrochemical double-layer capacitor which has a first electrode having a first porous material mixed with a first organosilicon electrolyte, and a second electrode. There may also be a separator disposed between the first and second electrodes.

Preferably the first organosilicon electrolyte is a solution of a lithium salt in an ion-conducting organosilicon compound, such as an oligoethyleneoxide-substituted organosilane (with one or more ethyleneoxide substituents) see FIG. 4. It is also highly preferred that the second electrode be a second porous material which is the same or different from the first porous material and is mixed with a second organosilicon electrolyte which is the same or different from the first organosilicon electrolyte.

The first and second porous materials are preferably selected from the group consisting of porous carbon, non-porous carbon with crystallites suitable for ions intercalation, porous metal oxides, or carbon modified with an electroactive polymer like polypyrrole or polyaniline. The first porous material is the same or different from the second porous material. For example, both could be carbon nanofibers or carbon nanotubes.

Where carbon nanofibers form the porous material they can optionally be in the form of a fiber "forest" in which the "trees of the forest" are sufficiently separated so that a row of the fibers can be the porous material for the first electrode, a second row of the fibers can be the porous material for the second electrode, a single pool of organosilicon ion conducting material mixed with a lithium salt can surround both electrodes, and no additional separator is required.

Ion-conducting organosilicon material is mixed with a lithium salt to prepare the electrolyte, and the resulting electrolyte is added to a porous material to form a supercapacitor electrode having particularly desirable properties. Also, optionally, ion-conducting solid organosilicon materials can be used as a binder of the porous material for structural stability. Also, optionally, ion-conducting solid organosilicon materials can be used to form a separator in such supercapacitors.

Preferred electrolytes of the present invention have high room temperature ionic conductivity (hence providing lower equivalent series resistance), high thermal and electrochemical stability (therefore higher operating voltages and temperatures), and lower volatility, toxicity and flammability which in turn provides safety and performance enhancement. In addition, they are much less hydrophilic than certain other conventional electrolytes and therefore are more compatible with hydrophobic carbonaceous electrode materials and dielectric hydrophobic conventional polymer separators based on polyethylene (PE) or polypropylene (PP) or polytetrafluoroethylene (PTFE).

Particularly advantageous is that the present invention, in some embodiments, permits operation at high voltages see FIG. 9. Thus, our EDLCs, as compared to conventional supercapacitors, allow obtaining devices with high energy density: $E=\frac{1}{2} CV^2$, where E is energy stored in supercapacitor in Wh per kg, C is capacitance in Farads, V is electric potential in Volts; and power density: $P=V^2/4R$, where P is a power density of the supercapacitor in W per kg, V is applied potential in Volts and R is equivalent series resistance in ohms.

Also, our preferred electrolytes, and thus our preferred electrodes, are relatively easy to make, and can be synthesized in high yields from available and relatively inexpensive starting materials. They are also stable in storage and processing.

As some of our preferred electrolytes are solids with high room temperature ionic conductivity, the EDLC can be fabricated as an all-solid-state device. Such an all-solid-state supercapacitor can be safely packed in an ultra thin laminated foil material. The lamination operation is simple and inexpensive. Also, a rolled-sheet manufacturing process can be used to fabricate components of the solid organosilicon supercapacitor. This technology can be used in exceptionally cost effective, high speed and high volume industrial supercapacitor production.

The all-solid-state organosilicon supercapacitors do not need to be packed in rigid, hermetically sealed metal containers, which in turn would require complicated and cost consuming winding, canning and hermetic sealing operations. Hermetically sealed metal containers reduce effective volume, especially in large packs, resulting in increase of the weight and volume proportion of the housing metal material in liquid multicell devices, in comparison to the all-solid-state supercapacitors.

The above and still other advantages of the present invention will be apparent from the description that follows. It should be appreciated that the following description is merely of the preferred embodiments of our invention. The claims should therefore be looked to in order to understand the full claimed scope of the invention.

DESCRIPTION OF THE PREFERRED EMBODIMENTS

Figure 1:
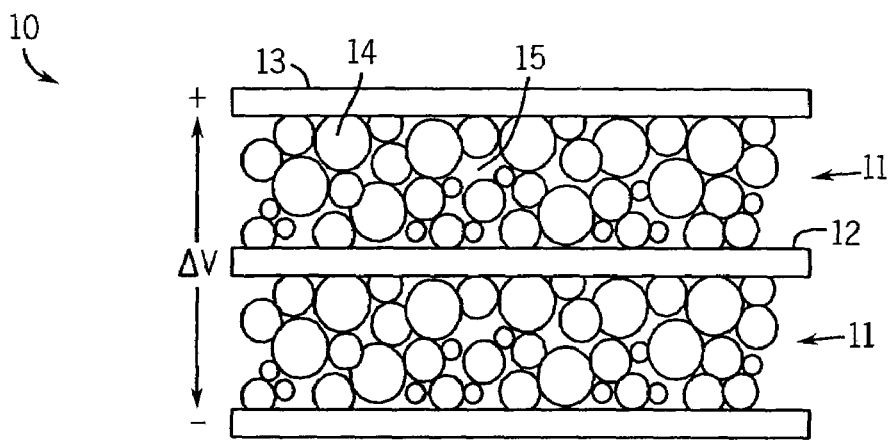
FIG. 1 depicts, in schematic form, a known structure for supercapacitors.

Beginning with the prior art device of FIG. 1, to create embodiments of the present invention one replaces conventional liquid electrolyte 15 with an organosilicon electrolyte in creating both electrodes 11. Optionally the cross-linked ion-conducting polymer can be used as a binder to impregnate high surface area porous electrode material to ensure cohesion of the active material. Also optionally the non-conductive conventional porous separator 12 can be replaced with the same dimension separator, albeit formed of solid ion-conducting polysiloxane material.

A. The Porous Electrode Material

Our preferred electrodes have as one component porous solid materials, particularly porous or nanostructured non-porous carbon or carbon aero gels, carbon nanotubes, carbon foams or carbon nanofibers. Porous and nanostructured metal oxides are also acceptable materials.

Carbon materials are particularly preferred because they can form specific porous textures, providing high surface area. Formation of mesopores or graphite crystallites suitable for ions intercalation in carbon materials is an important factor in determining the quality of carbon as an electrode material. See generally E. Frackowiak et al., Carbon materials for the electrochemical storage of energy in capacitors, 39 Carbon 937-950 (2001); G. Gryglewicz et al., Effect of pore size distribution of coal-based activated carbons on double layer capacitance, 50 Electrochimica Acta 1197-1206 (2005); and U.S. Pat. No. 6,721,168.

Such porous materials may have relatively large pore diameters and good pore connectivity, so that electrolyte can easily penetrate the pores, facilitating rapid ion motion and high conductivity. Electrons can then easily flow from the electrode to the current collector and vice versa. While a variety of porous structures are suitable, pores with widths in the range of 2 nm to 50 nm appear particularly desirable.

Alternatively, high surface area nanostructured graphite materials forming crystallites suitable for ions intercalation can be used in the embodiments of this invention (see generally U.S. Pat. No. 6,721,168).

Carbon nanotubes and carbon nanofibers also be used as porous electrode materials. For information on previous use of carbon nanotubes as an electrode material in supercapacitors see generally: Y. Hee et al., Carbon Nanotube-Based Supercapacitors, 1 Encyclopedia Of Nanoscience And Nanotechnology 625-634, American Scientific Publishers (2004); M. Hughes, Carbon Nanotube-Conducting Polymer Composites In Supercapacitors, 1 Encyclopedia Of Nanoscience And Nanotechnology 447-459, American Scientific Publishers (2004); E. Frackowiak, Carbon Nanotubes For Storage Of Energy: Supercapacitors, Encyclopedia of Nanoscience and Nanotechnology, Marcel Dekker, New York (2004).

Carbon nanotubes having an interconnected network of molecules form open mesopores, facilitating fast ion transport due to the high accessibility of the electrode-electrolyte interface. High electronic percolation conductivity of carbon nanotubes is another important property, which complements this particular application.

Pristine carbon nanotube molecules constitute concentrically rolled graphite sheets capped by six pentagons at each end. The end caps do not allow electrolyte molecules and ions to penetrate the internal volume of the tubes. Also, due to the high aggregation forces carbon nanotubes usually form strong bundles in the bulk. Capping and aggregation of carbon nanotube molecules in bundles significantly reduces their effective charge separation surface, and thus their utility as a supercapacitor electrode material.

To increase active surface area and volume of mesopores in carbon nanotubes and to disperse their bundles, the pristine material has to be activated. Activation of the carbon nanotubes can be achieved by chemical treatment with strong oxidants, for example concentrated nitric acid. See generally S. Tsang et al., A simple chemical method of opening and filling carbon nanotubes, 372 Nature 159-162 (1994); Z. Jia et al., Production of short multi-walled carbon nanotubes, 37 Carbon 903-906 (1999).

Presence of the five-member rings in the hexagonal array at the nanotubes tips results in strain in the vicinity of the molecules and makes them susceptible to oxidation of the tips on the double bonds connecting the pentagons. Also treatment of the carbon nanotubes with nitric acid results in an increase of packing density and local alignment of molecules in the films favorable for this particular application. See generally C. Du et al., High power density supercapacitors using locally aligned carbon nanotube electrodes, 16 Nanotechnology 350-353 (2005); C. Du et al., Carbon nanotube thin films with ordered structures, 15 J. Mat. Chem. 548-550 (2005).

Another approach to increase packing density and surface accessibility is to fabricate vertically aligned arrays of nanotubes and nanofibers on electroconductive bases. See generally Z. F. Ren et al., Synthesis of Large Arrays of Well-Aligned Carbon Nanotubes on Glass, 282 Science 1105-1107 (1998); J. Li et al., Nanoelectronics: Growing Y-junction carbon nanotubes, 402 Nature, 253-254 (2000); and R. H. Baughman et al., Carbon Nanotubes—the Route Toward Applications, 297 Science, 787-792 (2002); S. Baker et al., Covalently Bonded Adducts of Deoxyribonucleic Acid (DNA) oligonucleotides with Single-Wall Carbon Nanotubes: Synthesis and Hybridization, 2 Nano Letters, 1413-1417 (2002); C. S. Lee et al., Electrically Addressable Biomolecular Functionalization of Carbon Nanotube and Carbon Nanofiber Electrodes, 4 Nano Letters, 1713-1716 (2004); U.S. patent application publication 2004/0235016.

These arrays can be fabricated using the well-known chemical vapor deposition technique. Carbon nanotube ordered arrays make it possible to obtain structures with controlled distances between nanotubes, avoiding carbon nanotube bundles formation and increasing the available surface area of nanotubes. For example, in a recent publication fabrication and electrochemical performance of structurally aligned multiwall carbon nanotube arrays as supercapacitor electrode materials was reported. Q. Chen et al., Fabrication and electrochemical properties of carbon nanotube array electrode for supercapacitors, 49 Electrochimica Acta 4157-4161 (2004).

Aligned arrays of carbon nanotubes and nanofibers possess much better electrical contact with current collectors, which is important for their application in electrode materials. In the pristine carbon nanotubes the random network of nanotubes provides poor electrical contact because each nanotube makes only a small number of point contacts to tubes underneath it. This increases the resistance and decreases the ability of the supercapacitor to respond to rapid changes in current loads.

In the vertically oriented arrays each nanotube or nanofiber molecule has direct electrical contact with the underlying base, which serves as a current collector. Furthermore, the more open structure of the vertically-oriented carbon nanotubes and nanofibers leads to increased accessibility of ions, reducing the tortuous path that is characteristic of most other porous materials. The improved electrical contact and increased accessibility of ions to the nanofiber surface both increase the high-frequency response of the capacitors (i.e., the ability handle fast changes in current).

For applications such as electrical energy storage in automobiles, this is important because operations such as acceleration, for example, require high instantaneous electrical current. We have demonstrated experimentally that arrayed carbon nanofiber electrodes have an electrical response that is flatter (i.e., less dependent on frequency) than for other electrodes such as carbon nanotubes, and that the carbon nanofiber electrodes have better high-frequency response than mats of carbon nanotubes.

Carbon nanofibers are also amenable to the fabrication of capacitor structures in which both electrodes are fabricated on a single base that provides mechanical support and electrical contact. The patterned growth is possible because the nanofibers are grown by a catalyzed process, and by controlling the location of the catalyst it is possible to precisely pattern the spatial location of the nanofibers, and thus electrodes. This ability makes it possible to produce multiple capacitors on a small structure using well-known procedures such as optical lithography and/or electron-beam lithography. This process eliminates the need for a separator.

Both electrodes of a supercapacitor structure can be simultaneously fabricated side-by-side using array of carbon nanofibers to provide high surface area. Such application may require using microelectronics fabrication processes such as "spin-on" methods. Such monolithic structures would also eliminate the need for a "separator" in an EDLC, potentially simplifying the overall construction of capacitor devices.

B. Electrolytes

To be useful as components of an electrolyte our organosilicon materials must be ion-conducting. Particularly preferred materials are the organosilanes and organosiloxanes, such as those having oligoethyleneoxide moieties (e.g. between 2 and 500 repeating units). These materials can have linear, branched, hyper-branched or cross-linked structure, and can be liquid (of varied viscosity), gel or solid.

Figure 4:
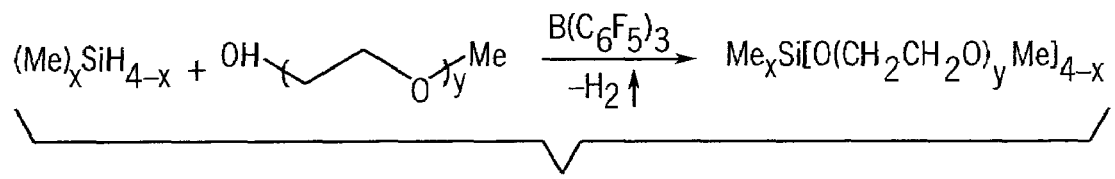
FIG. 4 illustrates a synthesis of a liquid silane electrolyte.

There may be just one silicon atom in the material (as is the case in $(CH_3)_3SiO—(CH_2CH_2O)_3—CH_3$, see also FIG. 4). The terminal groups are not critical and may generally be alkyl or substituted alkyl.

Figure 5:
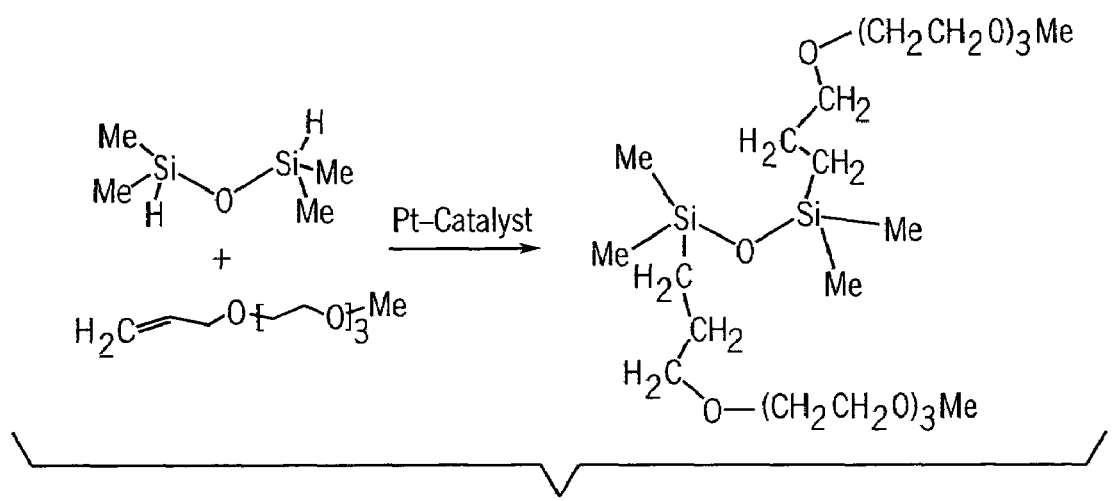
FIG. 5 illustrates a synthesis of a liquid disiloxane electrolyte.
Figure 6:
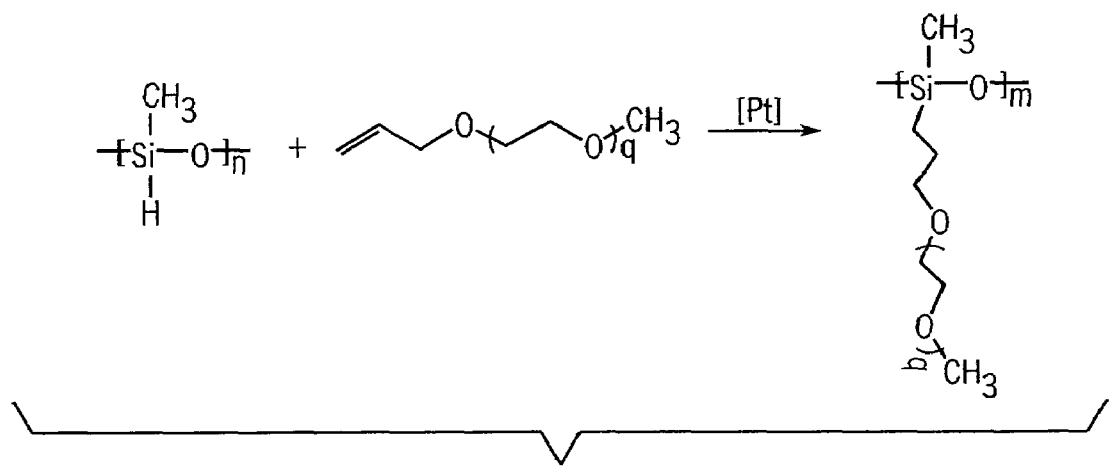
FIG. 6 illustrates a synthesis of a polysiloxane electrolyte.

Alternatively, the organosilicon material may have two or more silicon atoms like in $(CH_3)_3SiO—(CH_2CH_2O)_3—Si(CH_3)_3$, or in disiloxane $CH_3 (OCH_2CH_2)_3OCH_2CH_2—Si (CH_3)_2OSi (CH_3)_2—CH_2CH_2CH_2O(CH_2CH_2O)_3CH_3$ (see FIG. 5), or have a polysiloxane chain structure with side groups containing such oligoethyleneoxide moieties (see FIG. 6). The length of the polysiloxane backbone is not critical.

Examples of other suitable ion-conducting organosilicon materials which can be used in embodiments of the present invention include:

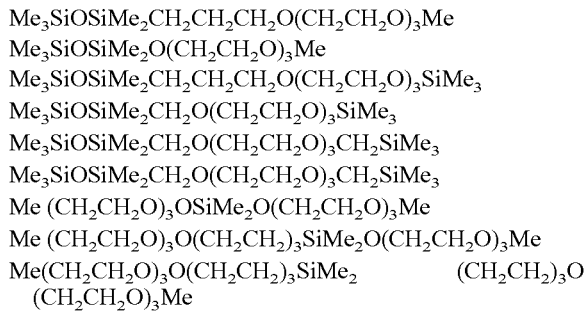

$Me_3SiOSiMe_2CH_2CH_2CH_2O(CH_2CH_2O)_3Me$
$Me_3SiOSiMe_2O(CH_2CH_2O)_3Me$
$Me_3SiOSiMe_2CH_2CH_2CH_2O(CH_2CH_2O)_3SiMe_3$
$Me_3SiOSiMe_2CH_2O(CH_2CH_2O)_3SiMe_3$
$Me_3SiOSiMe_2CH_2O(CH_2CH_2O)_3CH_2SiMe_3$
$Me_3SiOSiMe_2CH_2O(CH_2CH_2O)_3CH_2SiMe_3$
$Me (CH_2CH_2O)_3OSiMe_2O(CH_2CH_2O)_3Me$
$Me (CH_2CH_2O)_3O(CH_2CH_2)_3SiMe_2O(CH_2CH_2O)_3Me$
$Me(CH_2CH_2O)_3O(CH_2CH_2)_3SiMe_2 \quad (CH_2CH_2)_3O (CH_2CH_2O)_3Me$ Preferred organosilicon electrolytes can be produced as liquids having high room temperature ionic conductivity ($\sigma_{RT}$ ~1×10$^{-3}$ S/cm). Further, they have compatibility with electrode materials, thermal and electrochemical stability, the capability of withstanding voltages higher than for any other known organic or aqueous electrolyte, very low volatility, and low flammability and toxicity. The preferred organosilicon liquid electrolytes produce no toxic vapors upon combustion or decomposition.

When our organosilicon electrolytes are produced as solids they have excellent mechanical stability, applicability to process and great packaging versatility. Solid polysiloxane materials are particularly well suited for this purpose. While they have somewhat lower ionic conductivity, their thermal and chemical stability is higher, and they can be in solid form at room temperature and are especially useful in all-solid-state supercapacitor fabrication.

Synthesis of various ion-conducting oligosiloxanes and their use as components of electrolyte materials for lithium batteries has been reported. See Richard Hooper et al., Highly Conductive Siloxane Polymers, 34 Macromolecules 931-936 (2001); R. Hooper et al., Novel siloxane polymers as polymer electrolytes for high energy density lithium batteries, 1 Silicon Chemistry 121-126 (2002); and R. Hooper et al., A Highly Conductive Solid-State Polymer Electrolyte Based on a Double-Comb Polysiloxane Polymer with Oligo(ethylene oxide) Side Chains, 18 Organometallics 3249-3251 (1999). See also U.S. Pat. No. 6,337,383, and U.S. patent application publications 2003/0180625 and 2003/0198869. See generally U.S. patent application publications 2004/0197665, 2004/0214090 and 2004/0248014.

Once one has the organosilicon ion-conducting material, one also needs to add an appropriate salt (preferably lithium salt) to produce organosilicon electrolyte material. Lithium salts that have been used in lithium batteries have been successfully tested in formulating organosilicon electrolytes. The best results were obtained for lithium-bis-oxalatoborate ($LiB(C_2O_4)_2$, LiBOB), lithium-tetrafluoroborate, and lithium-(trifluoromethylsulfonyl)-imide ($LiN(SO_2CF_3)_2$, LiTFSi), but the invention is not restricted to just these salts.

C. Separator

Separators for use in the EDLCs of the present invention can be of conventional structure. For example, they can be made of polymer film of porous structure such as PE, PP, or PTFE films, or other known materials which have been used as a separator in an EDLC. See generally separator film products of Celgard Inc., W.L. Gore & Associates Inc., AMTEK Research International LLC, etc.

Alternatively, solid cross-linked polysiloxane polymers such as those described below (e.g. in Example 1) could be used as a separator film with about 25 to 50 μm thickness, for example.

D. Current Collector

On the exterior surface of the electrode/separator "sandwich" we position current collectors. These are electro-conductive metal plates or films, like aluminum, nickel, copper, molybdenum, titanium, steel, or any other known electro-conductive material which can be used as a current collector in supercapacitors.

Example 1

In this example an EDLC device was fabricated from activated carbon nanotubes deposited on stainless steel current collectors, using solid cross-linked organosiloxane polymer as the electrolyte, separator and as a binder.

Fabrication of the device began with preparation of the electrode/current collector assembly plates from activated carbon nanotubes powder. The multi-walled carbon nanotubes (MWCNTs) used for this study were produced by chemical vapor deposition and treated with hydrochloric acid at room temperature to extract catalyst and other impurities. The nanotubes powder then was washed with distilled water and dried.

Purified MWCNTs were refluxed with concentrated boiling nitric acid for about 10 hours for activation, and then washed with distilled water followed by rinsing with ethanol and drying in vacuum $10^{-3}$ mmHg at 60° C. Activated nanotubes then were dispersed by ultrasound sonication for 30 min in dimethylformamide (DMF) to prepare a colloidal suspension.

The colloidal suspension was deposited directly onto two polished stainless steel disks (8 mm diameter) and dried in vacuum $10^{-3}$ mmHg at 150° C. to produce an assembly of electrode/current collector plates. The total weight of MWCNTs in both plates was 0.9 mg as it was measured using micro-analytical balances.

The MWCNTs of the electrodes assembly were then impregnated with a cross-linkable organosilicon ion-conducting polymer precursor, the cross-linker, the inhibitor and the catalyst dissolved in THF.

The cross-linkable organosilicon polymer precursor was synthesized according to the procedures described in U.S. Pat. No. 6,887,619 (see FIG. 2). See also the teachings of Z. Zhang et al., Ion conductive characteristics of cross-linked network polysiloxane-based solid polymer electrolytes, 170 Solid State Ionics 233-238 (2004); Z. Zhang et al., Cross-Linked Network Polymer Electrolytes Based on a Polysiloxane Backbone with Oligo(oxyethylene) Side Chains: Synthesis and Conductivity, 36 J. Macromolecules 9176-9180 (2003); and Z. Zhengcheng et al., Network-Type Ionic Conductors Based on Oligoethyleneoxy-Functionalized Pentamethylcyclopenta-siloxanes, 38 Macromolecules 5714-5720 (2005).

Figure 2:
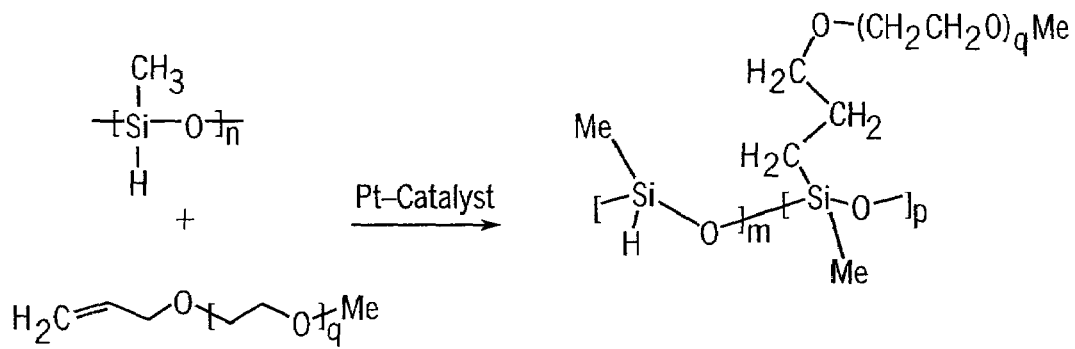
FIG. 2 illustrates a synthesis of a precursor for a preferred cross-linked solid organosilicon electrolyte.
Figure 3:
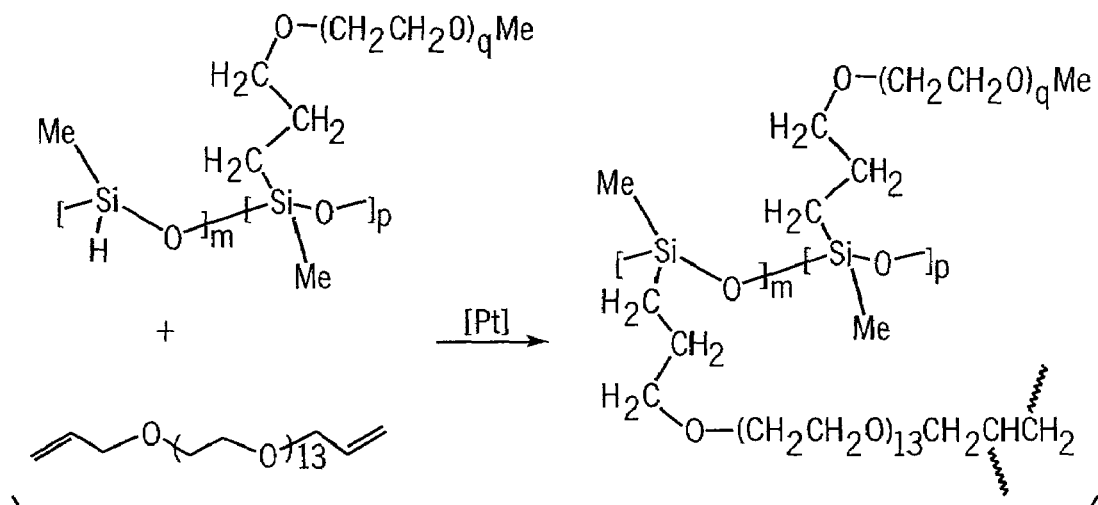
FIG. 3 illustrates the cross-linking of the precursor to create a preferred cross-linked solid organosilicon electrolyte useful in connection with the present invention.

Per FIGS. 2 & 3, and with n=20, p=10, and q=13, the reaction solution, which was prepared by dissolving 85.7 mg of the precursor, 7.8 mg of the cross-linker, 20 mg of lithium salt (LiTFSi) and 5 μL of the Pt-catalyst solution (platinum-divinyltetramethyl-disiloxane, ~100 ppm, Karlstedt's catalyst xylene solution, Aldrich) in 1 ml of dry THF, was applied drop by drop to the surface of MWCNTs of the two electrode assemblies until a visible meniscus was formed.

Both impregnated electrodes assembled on current collector plates were then heated at 80° C. in vacuum for 15 minutes until a gel layer was formed on the surface of carbon nanotubes and then they were joined together by the gel-polymer layer sides without using any pressure, and then heated at 80° C. in vacuum for 12 hours. The sandwich structure with the collector plates on the outside and inner layers of MWCNTs impregnated with a solid cross-linked organosilicon electrolyte forming the electrodes, and the cross-linked solid organosilicon electrolyte forming a separator in the inside was produced.

Figure 7:
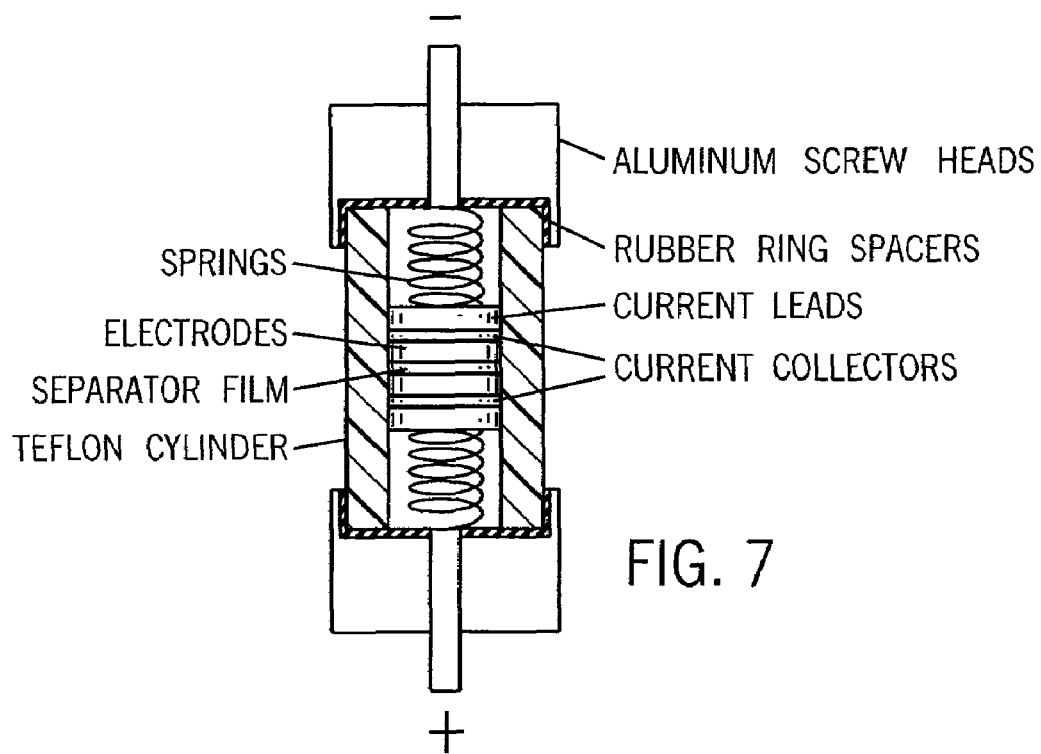
FIG. 7 is a schematic depiction of a two-electrode Teflon Swagelok supercapacitor cell, in which electrodes and a separator of the present invention have been positioned.

The assembled sandwich device was placed into the Teflon Swagelok electrochemical cell of FIG. 7, and tested by the impedance spectroscopy, cyclic voltammetry, and galvanostatic charge/discharge methods. Various tests were conducted on this cell confirming its ability to operate across a wide range of voltages, as well as its ability to operate stably.

Example 2

An electric double layer capacitor was prepared in the same manner as in Example 1, except that vertically aligned carbon nanofibers were used as a high surface area carbonaceous component of the electrode material (for two electrodes) instead of activated carbon nanotubes. We used a 0.8M solution of LiBOB in liquid disiloxane of FIG. 5 as the electrolyte, and used a PE/PP/PE tri-layer film (Celgard 3501, 25 μm) as a conventional separator.

Vertically aligned carbon nanofibers were grown on titanium/nickel coated stainless steel substrates using DC plasma-enhanced chemical vapor deposition. Typical growth conditions used flow rates of 80 standard cubic centimeters per minute (sccm) ammonia and 30 sccm acetylene, with a chamber pressure of 4 Torr and a DC power of 360 watts. Each metal layer in Ti/Ni coating had 50 nm thickness.

Figure 8:
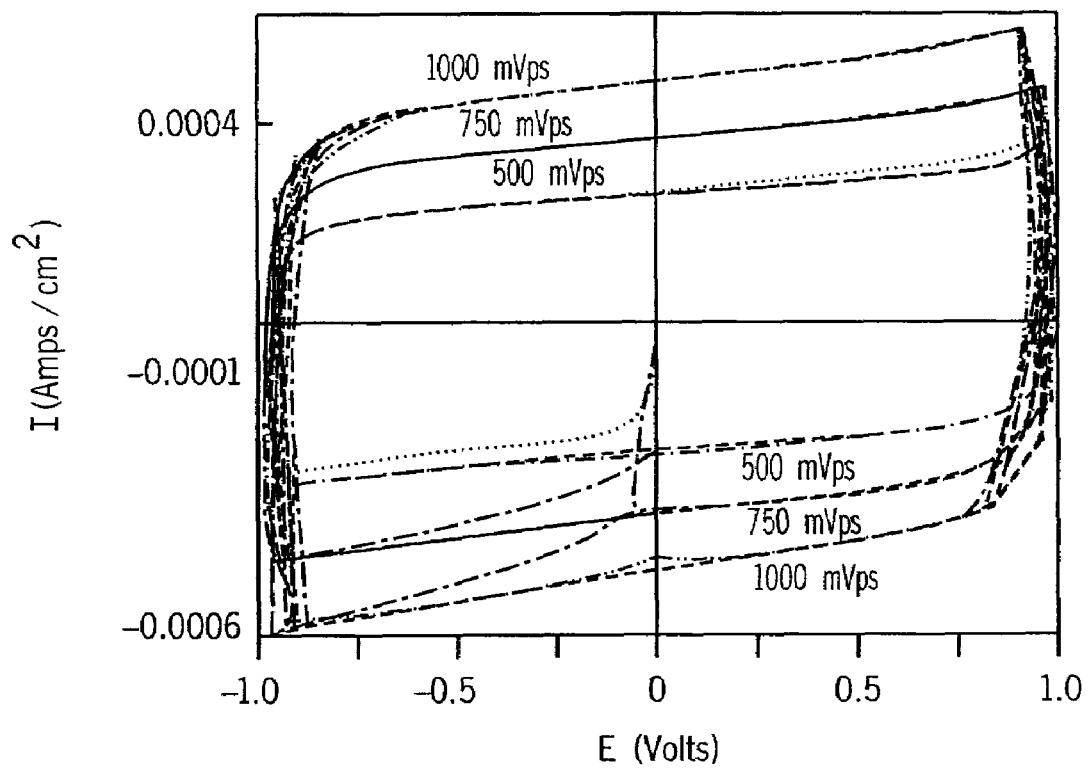
FIG. 8 illustrates the results of cyclic voltammetry test for an EDLC device of the present invention using arrayed nanofiber electrodes, conventional separator film and liquid organosilicon electrolyte.
Figure 9:
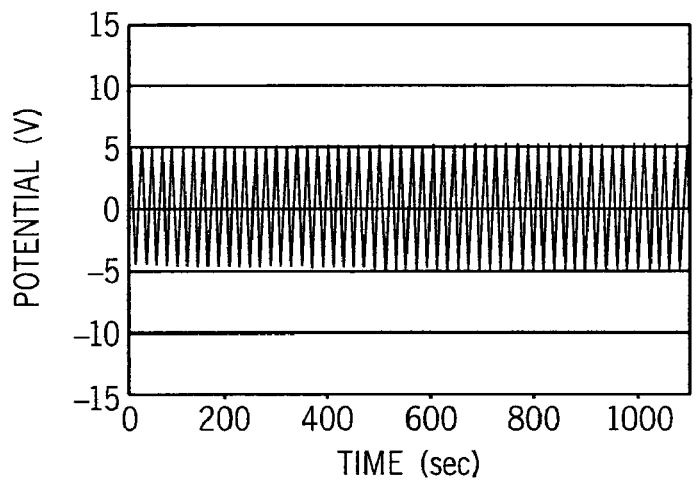
FIG. 9 illustrates the results of galvanostatic charge/discharge stability tests for an EDLC device of the present invention using arrayed nanofiber electrodes, conventional separator film and liquid organosilicon electrolyte.

A two-electrode assembly, containing arrayed nanofiber electrodes of this example, was then placed into the Teflon Swagelok electrochemical cell (FIG. 7) and tested. Test results of the EDLC of this example are presented in FIGS. 8 & 9.

Example 3

Figure 10:
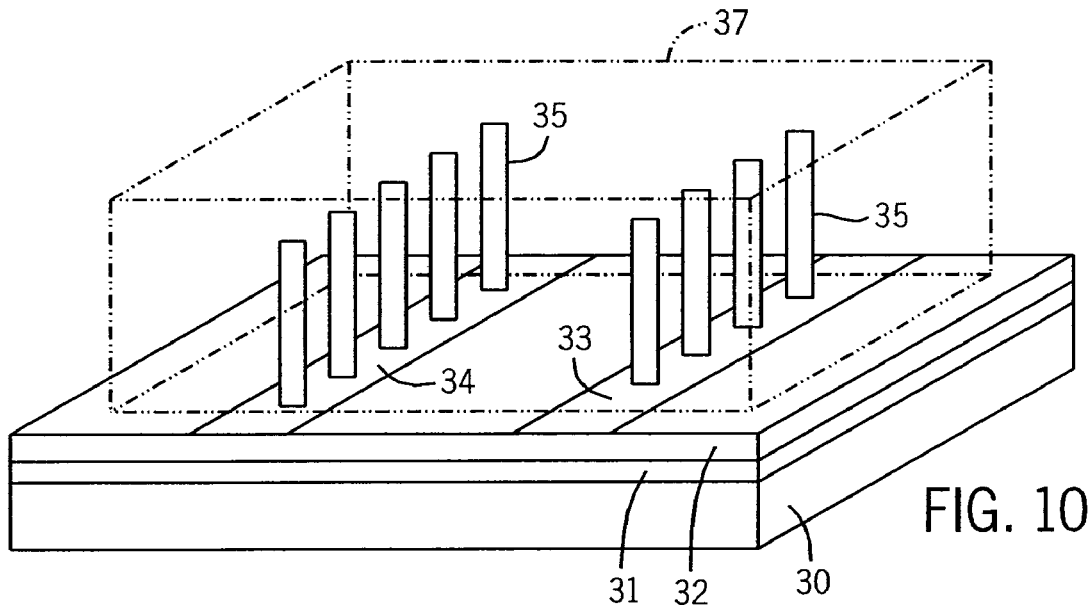
FIG. 10 illustrates a structure of a monolithic EDLC device with electrodes fabricated from carbon nanofiber patterned arrays grown on the same substrate.

Attention is called to FIG. 10 where there is shown an alternative monolithic nanofiber based EDLC. There is shown a substrate 30 preferably made of silicon nitride. The substrate is then coated with a thin layer of molybdenum 31, which is in turn coated with a thin layer of titanium 32. Spaced strips of nickel 33/34 are then positioned along the structure.

Vertically aligned carbon nanofibers 35 were then grown on the nickel lines using DC plasma-enhanced chemical vapor deposition. The growth conditions we used were the same as in Example 2.

Figure 11:
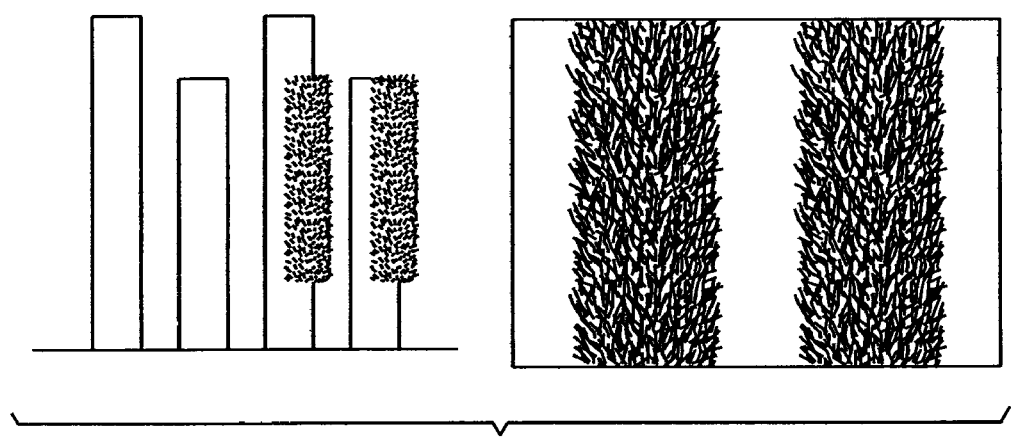
FIG. 11 are surface electron microscopy photographs of monolithic EDLC device electrodes made of aligned arrays of carbon nanofibers useful in connection with the present invention.

In this example, our most preferred form nanofibers were grown on silicon nitride substrates that we covered with a thin film consisting of 50 nm Mo, followed by 20 nm Ti, and finally 20 nm Ni as the top layer strips. SEM images (see FIG. 11) show that the nanofibers were vertically aligned with an average diameter of ~75 nm. The length of the nanofibers was controlled by varying the duration of the growth. Nanofibers used for our tests were obtained with a growth time of 15 minutes, which yielded fibers with an average length of approximately 3 μm.

One row of fibers over the line 33 formed a first electrode, while a second row of fibers over the line 34 formed a second electrode, with the nickel lines 33 and 34 functioning as current collectors. The resulting structure was encased by a case 37 into which a common pool of electrolyte (not shown) functioned as the electrolyte for both electrodes.

The lines 33 and 34 should preferably be very close together to maximize the efficiency of the EDLC. In this regard, lines a few microns apart have been tested, with preferred spacing in the range of 0.1 micron to 1,000 microns.

It should be appreciated that this monolithic structure avoids the need for a separator between the electrodes. The two electrodes can have their high surface area "porous" material formed simultaneously.

Example 4

In this example the high surface area porous materials were prepared from activated carbon (rather than nanotubes or nanofibers), the separator was a standard PE/PP/PE tri-layer separator (Celgard), and different liquid organosilicon electrolytes were used to fabricate the device.

The 8 mg of high purity activated carbon powder with a specific surface area of 2000 m2/g and an average particle size of 2 μm (80 wt. %), 1 mg of acetylene black (10 wt. %) and 1 mg poly-tetrafluoroethylene (PTFE) powder (10 wt. %) were mixed in 1 ml of ethanol by ultrasonication to produce slurry. The slurry then was deposited on one side of an aluminum disk of 12 mm diameter and 500·m thickness, with a surface roughened prior to its use by chemical etching.

After drying in the air for 30 minutes, the coated disk was further dried in vacuum ($10^{-3}$ Torr) at 130° C. for 60 minutes to provide a porous carbon electrode material. A pair of the obtained electrodes was combined together interlaying a standard prior art high molecular weight separator membrane of 25·m thickness (Celgard) there between.

The electrode-separator-electrode body was then impregnated by the vacuum soak method with 1 ml of a solution of liquid organosilicon electrolyte prepared by dissolving LiBOB and poly(siloxane-g-oligoethyleneoxide) in THF. Quantities of materials were used to produce 0.5 M concentration of the salt in the polymer. See generally U.S. patent application publication 2003/0180625 for synthesis of these types of polymers.

Thereafter, the impregnated unit was dried in vacuum at $10^{-3}$ Torr at 130° C. and then housed in a Swagelok electrochemical cell with aluminum lead wires and Teflon packing. Varied tests were conducted on this cell confirming its ability to operate across a wide range of voltages, as well as its ability to operate stably.

Example 5

For this EDLC the Example 1 was followed except that methoxyethoxyethoxyethoxytrimethylsilane was used as the ion-conducting organosilicon component of a liquid organosilicon electrolyte containing 0.8 M LiBOB salt to impregnate the MWCNTs before applying the solid cross-linked organosilicon polymer/LiBOB separator layer.

Example 6

For this EDLC the device was prepared in the same manner as in Example 4, except that solid cross-linked organosilicon electrolyte described in U.S. Pat. No. 6,887,619 was used to fabricate a separator film.

Example 7

For this EDLC the device was prepared in the same manner as in Example 1, except that the lithium salt LiBOB was used as a component of the solid organosilicon electrolyte.

Example 8

For this EDLC the device was prepared in the same manner as in Example 2, except that a solid cross-linked organosilicon electrolyte was used to impregnate carbon nanofibers and as a separator film.

The assembled sandwich device was placed into the Teflon Swagelok electrochemical cell of FIG. 7, and tested by the impedance spectroscopy, cyclic voltammetry, galvanostatic charge discharge methods, confirming its ability to operate across a wide range of voltages, as well as its ability to operate stably.

Example 9

A similar device could be constructed using the FIG. 5 electrolyte and the above techniques.

Example 10

A similar device could be constructed using the FIG. 6 electrolyte and the above techniques.

Test Results

Our testing confirmed that we could construct EDLC devices which could stably and efficiently operate at a wide variety of voltages, and could do so even at voltages higher than 2.7 V, which is the state of the art value today for industrial organic electrolytes. See FIG. 9.

Other Embodiments

While a number of embodiments of the present invention have been described above, the present invention is not limited to just these disclosed examples. There are other modifications that are meant to be within the scope of the invention and claims. For example, the monolithically constructed carbon nanofiber electrodes could be used with other liquid electrolytes (regardless of whether organosilicon in nature).

Thus, the claims should be looked to in order to judge the full scope of the invention.

INDUSTRIAL APPLICABILITY

The present invention provides improved supercapacitors, and improved electrodes and separators for use therewith. They could, for example, be used in electric and hybrid-electric vehicles, satellites, wind generators, photovoltaics, copy machines, high power electronic household appliances, electric tools, electric power generation, and electric distribution systems.

We claim:

1. An electrode for use in an electrochemical capacitor, the electrode comprising:
    a solid material with an exposed surface, wherein the exposed surface is selected from the group consisting of aligned arrays of nanostructured carbon and aligned arrays of carbon nanofibers;
    an organosilicon ion-conducting material; and
    a salt.

2. The electrode of claim 1, wherein the material is a cross-linked polysiloxane.

3. The electrode of claim 1, wherein the salt is a lithium salt selected from the group consisting of lithium-tetrafluoroborate, lithium-bis (trifluoromethyl-sulfonyl)imide, and lithium bis-(oxalatoborate).

4. An electrode for use in an electrochemical capacitor, the electrode comprising:
    a solid material with an exposed surface;
    an organosilicon ion-conducting material; and a salt;
    wherein the organosilicon ion-conducting material comprises an oligoethyleneoxide substituted organosilicon compound which has the following moiety in it:

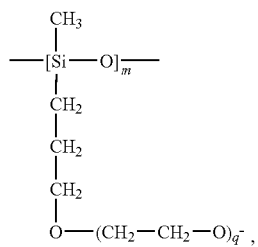

wherein m is such that the compound is a polysiloxane and q is such that the compound is an oligoethyleneoxide substituted organosilicon compound.

5. An electrochemical double-layer capacitor comprising a separator to inhibit short circuiting that is disposed between first and second electrodes, wherein the separator comprises an organosilicon ion-conducting material which is a cross-linked oligoethyleneoxide substituted organosiloxane compound.

* * * * *

UNITED STATES PATENT AND TRADEMARK OFFICE
CERTIFICATE OF CORRECTION

PATENT NO. : 7,612,985 B2  Page 1 of 1
APPLICATION NO. : 12/168405
DATED : November 3, 2009
INVENTOR(S) : Viacheslav V. Dementiev et al.

It is certified that error appears in the above-identified patent and that said Letters Patent is hereby corrected as shown below:

In line 1 of claim 1, change [f or] to --for--.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,612,985 B2  Page 1 of 1
APPLICATION NO. : 12/168405
DATED : November 3, 2009
INVENTOR(S) : Viacheslav V. Dementiev et al.

It is certified that error appears in the above-identified patent and that said Letters Patent is hereby corrected as shown below:

Column 12, Claim 1, line 46, change [f or] to --for--.

This certificate supersedes the Certificate of Correction issued December 22, 2009.

Signed and Sealed this

Twelfth Day of January, 2010

David J. Kappos
*Director of the United States Patent and Trademark Office*